(12) United States Patent
Heath

(10) Patent No.: US 7,744,042 B2
(45) Date of Patent: Jun. 29, 2010

(54) OFFSET HANGER

(75) Inventor: Richard W. Heath, Yorba Linda, CA (US)

(73) Assignee: Nibco Inc., Elkart, IN (US)

( * ) Notice: Subject to any disclaimer, the term of this patent is extended or adjusted under 35 U.S.C. 154(b) by 0 days.

(21) Appl. No.: 12/398,429

(22) Filed: Mar. 5, 2009

(65) Prior Publication Data
US 2009/0224127 A1 Sep. 10, 2009

Related U.S. Application Data

(60) Provisional application No. 61/033,907, filed on Mar. 5, 2008.

(51) Int. Cl.
*E21F 17/02* (2006.01)
*F16L 3/00* (2006.01)

(52) U.S. Cl. .............................. 248/65; 248/58; 248/62; 248/74.1

(58) Field of Classification Search ................ 248/65, 248/58, 74.1, 60, 62, 300, 200
See application file for complete search history.

(56) References Cited

U.S. PATENT DOCUMENTS

| | | | | |
|---|---|---|---|---|
| 844,494 | A * | 2/1907 | Best ............................ | 122/510 |
| 948,902 | A | 2/1910 | Noyes | |
| 1,732,483 | A * | 10/1929 | Rachlin ...................... | 248/74.5 |
| 1,896,898 | A * | 2/1933 | Hildebrand .............. | 248/228.4 |
| 1,964,770 | A | 7/1934 | Runge | |
| 2,474,172 | A * | 6/1949 | Tinnerman ................... | 403/252 |
| 2,981,513 | A | 4/1961 | Brown | |
| 3,615,110 | A | 10/1971 | Fugate | |
| 3,802,655 | A | 4/1974 | Schuplin | |
| 4,991,801 | A | 2/1991 | Trumbull | |
| 5,297,890 | A * | 3/1994 | Commins ................... | 403/398 |
| 5,740,994 | A | 4/1998 | Laughlin | |
| 6,634,606 | B2 * | 10/2003 | Heath ......................... | 248/74.1 |
| 6,648,278 | B1 * | 11/2003 | Kirschner ..................... | 248/62 |

FOREIGN PATENT DOCUMENTS

GB     300769     11/1928

OTHER PUBLICATIONS

ERICO brochure *Stand-Off 2-Hole Strap Hanger* for CPVC Fire Protection Piping (1 page).
TOLCO Incorporated "Stand-Off" Hanger/Restrainer for CPVC Plastic Pipe (Fig. 27 & 27A) (1 page).
AFCON #514—Offset—C.P.V.C. Hanger/Restrainer (1 pg.).
ERICO—#S.O. — C.P.V.C. Pipe Hanger Offset (1 pg.).

* cited by examiner

*Primary Examiner*—Anita M King
(74) *Attorney, Agent, or Firm*—Knobbe, Martens, Olson & Bear, LL.

(57) ABSTRACT

An offset hanger has a central retainer portion, a first leg and a second leg. The central retainer portion defines a segment of a generally cylindrical shape. A center axis is defined along the center of the generally cylindrical shape. A first pair of gussets extends from the central retainer portion to the first leg. A second pair of gussets extends from the central retainer portion to the second leg. Each pair of gussets comprises at least two gussets that are spaced apart in the axial direction of the generally cylindrical shape.

13 Claims, 4 Drawing Sheets

OFFSET HANGER

CROSS-REFERENCE TO RELATED APPLICATIONS

This application claims the benefit of priority under 35 U.S.C. §119(e) of U.S. Provisional Patent Application No. 61/033,907, filed Mar. 5, 2008 which is hereby incorporated herein by reference in its entirety.

BACKGROUND OF THE INVENTION

1. Field of the Invention

The present invention generally relates to construction hardware used to mount utilities.

2. Description of the Related Art

For various purposes, conduit, pipe and miscellaneous architectural, decorative and mechanical devices are mounted to buildings. To do so, a wide variety of brackets and other hardware have been developed. Such hardware is frequently, if not universally, the subject of building code requirements, UL specifications and the like. Offset hangers are used to mount pipe and conduit to a wall stud or the like with a predetermined gap provided between the wall stud and the pipe or conduit. The offset defines the gap. Cantilevered forces, therefore, are applied to such hardware. Thus, it is advantageous to have structurally rigid and easily mounted hangers to secure utilities within a structure.

SUMMARY OF THE INVENTION

One aspect of an embodiment arranged and configured in accordance with certain features, aspects and advantages of the present invention comprises an offset hanger comprising an integrally formed body. The body comprises a central retainer portion, a first leg extending from the central retainer portion and a second leg extending from the central retainer portion. The central retainer portion comprises a main body having a portion of a generally cylindrical shape. The generally cylindrical shape has an axis. A first rib and a second rib are positioned along the main body and are spaced apart in an axial direction of the generally cylindrical shape. The first leg has a proximal end connected to the main body and the second leg has a proximal end connected to the main body. A first pair of gussets is spaced apart in the axial direction of the generally cylindrical shape and extends from the first and second ribs of the main body to the first leg. A second pair of gussets is spaced apart in the axial direction of the generally cylindrical shape and extends from the first and second ribs of the main body to the second leg.

BRIEF DESCRIPTION OF THE DRAWINGS

These and other features, aspects and advantages of the present invention will be described with reference to drawings of a preferred embodiment.

DETAILED DESCRIPTION OF THE PREFERRED EMBODIMENT

With reference now to FIGS. 1-5, a preferred embodiment of an offset hanger 10 is illustrated. The offset hanger 10 embodies certain features, aspects and advantages of the present invention. The offset hanger 10 preferably is integrally formed from a metal blank, such as a metal strip or sheet. Any suitable forming processes can be used to transform the blank into the finished offset hanger 10. Integral formation increases rigidity, reduces manufacturing steps and complications, and reduces overall costs. In some configurations, the offset hanger 10 can be formed of other materials and other manufacturing methods can be used.

Figure 1:
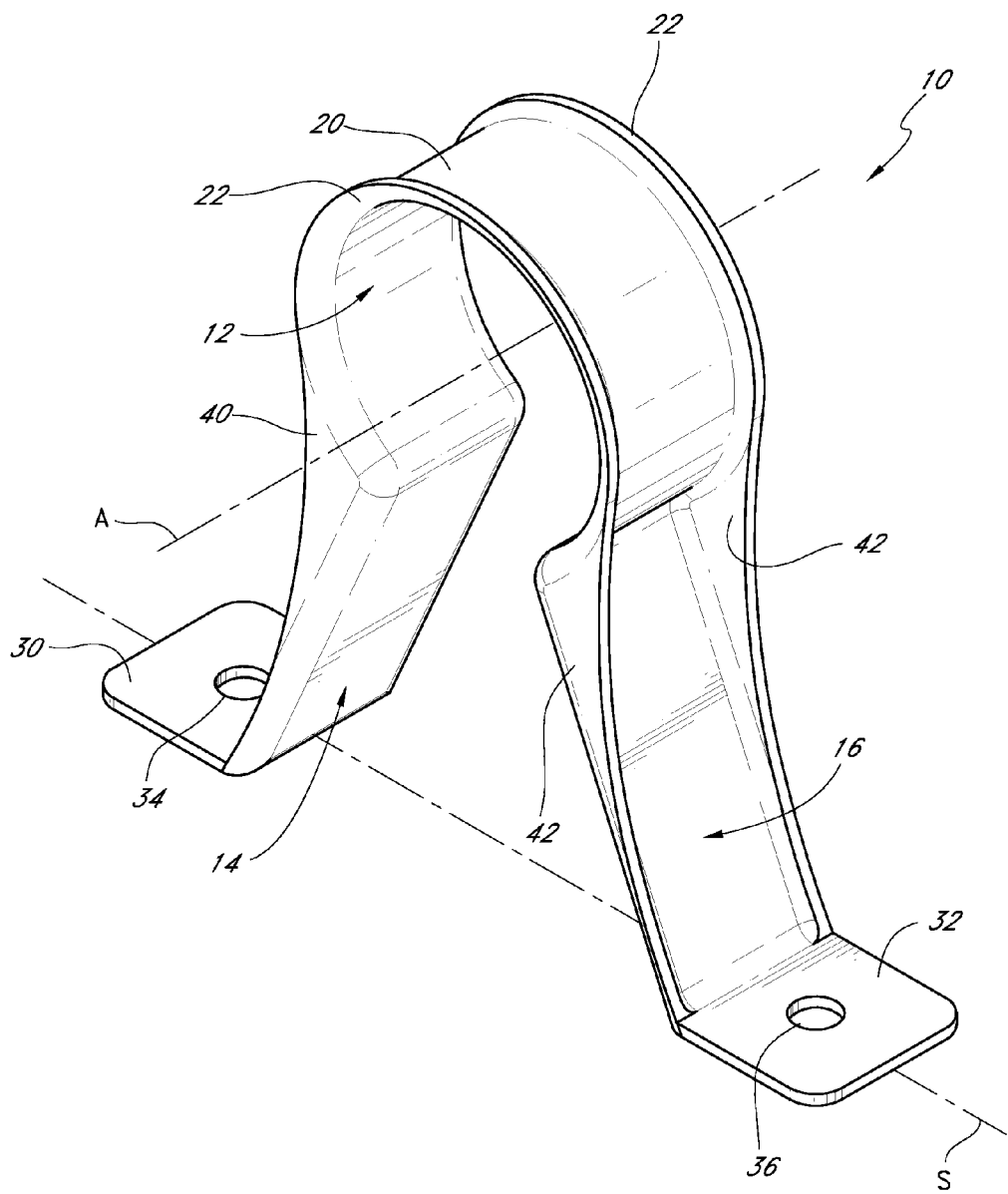
FIG. 1 is a perspective view of an offset hanger that is arranged and configured in accordance with certain features, aspects and advantages of the present invention.

As shown in FIG. 1, the offset hanger 10 generally comprises a central retainer portion 12 that is supported by a first leg 14 and a second leg 16. The central retainer portion 12 defines a central axis A. Because the offset hanger 10 typically will be used to support cylindrical components, such as tubes, pipes and conduit, the central axis A preferably extends through the portion of the offset hanger 10 and corresponds to a location of a centerline of any such supported cylindrical components. Moreover, the central retainer portion preferably comprises a generally cylindrical shape. By generally cylindrical shape, unless otherwise stated, it is intended that other shapes that can provide sufficient support to a cylindrical component can be used, such as octagons, hexagons or the like.

As illustrated, the legs 14, 16 preferably have distal ends that, in use, are supported on a support surface, which is represented by line S in FIG. 1. The legs 14, 16 space the central retainer portion 12 above the support surface S by a distance H. The distance H can be any suitable distance but, in most cases, the distance H will be designated by code requirements, such as those issued by National Fire Protection Association.

With reference still to FIG. 1, the central retainer portion 12 preferably comprises a main body 20 and a rib 22 at each axial end. The ribs 22 extend outward from the main body 20 such that the axial ends of the main body 20 can be said to have rolled or flared outer edges. The ribs 22 strengthen the ends of the main body 20 and provide some degree of increased resiliency to the axial ends of the main body 20.

Figure 2:
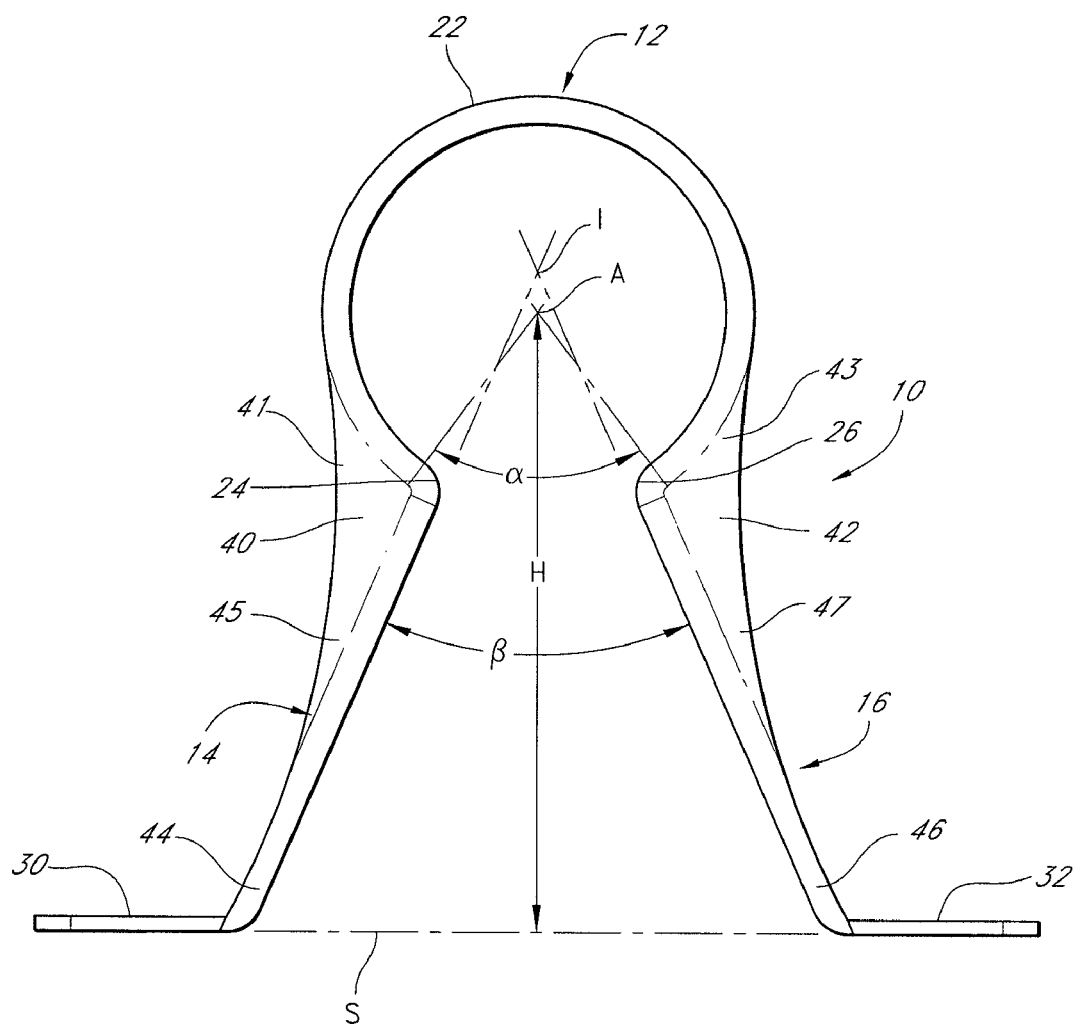
FIG. 2 is a front side view of the offset hanger of FIG. 1 and a rear side view of the offset hanger would be substantially identical to the front side view of the offset hanger.
Figure 3:
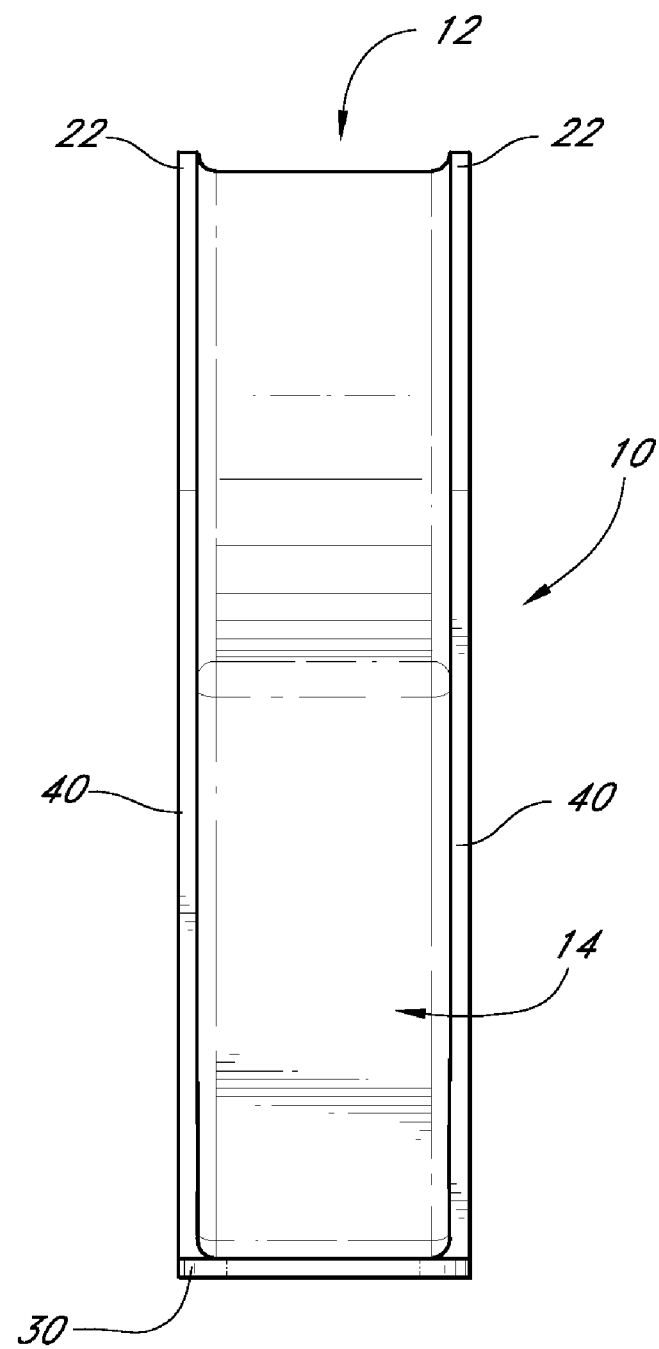
FIG. 3 is a left side view of the offset hanger of FIG. 1 and a right side view of the offset hanger would be substantially identical to the left side view of the offset hanger.
Figure 4:
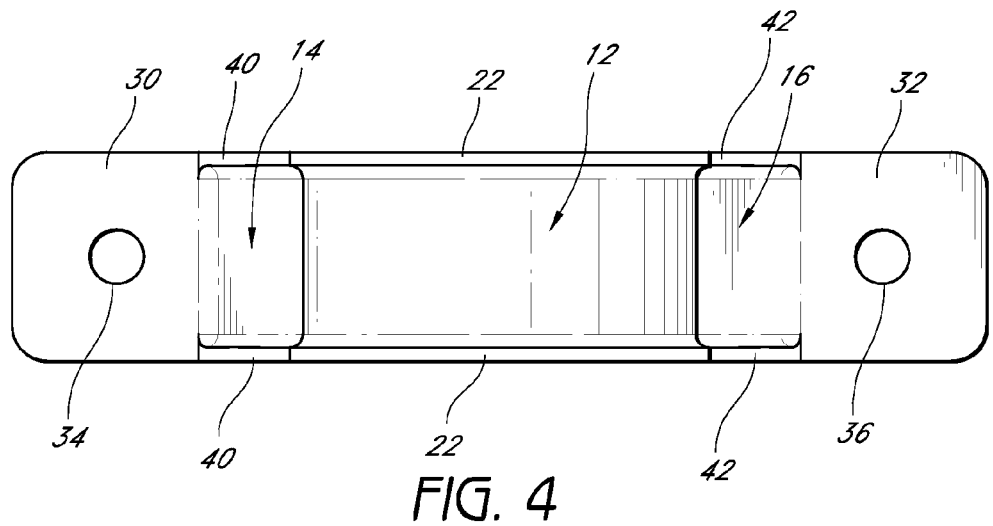
FIG. 4 is a top plan view of the offset hanger of FIG. 1.
Figure 5:
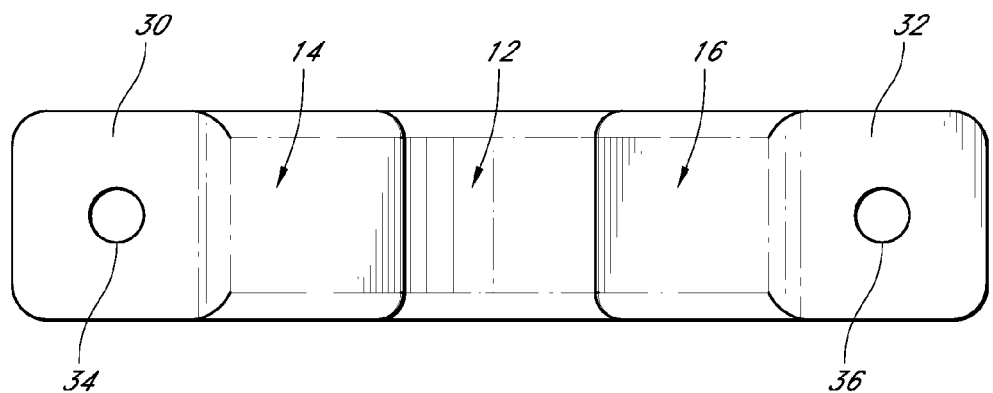
FIG. 5 is a bottom plan view of the offset hanger of FIG. 1.

With reference now to FIG. 2, the central retainer portion 12, and in particular the main body 20 and the ribs 22, preferably extends more than 180° but less than 360° about the central axis A. In some configurations, an opening angle α is defined relative to the central axis A and the opening angle is about 74°. In some embodiments, this angle allows the offset hanger 10 to snap over the supported component while still providing sufficient contact with the supported component to provide adequate support during loading in all directions.

In the illustrated configuration, the legs 14, 16 extend away from the central retainer portion 12 such that they define an included angle β of less than about 90°. In one configuration, the included angle β is about 47°. Extensions of the legs 14, 16 would intersect at an intersection point I. In the illustrated configuration, the intersection point I is positioned further away from the legs than the central axis A (i.e., in FIG. 2, the intersection point I is above the central axis A).

With continued reference to FIG. 2, a first juncture 24 is defined between the first leg 14 and the central retainer portion 12 while a second junction 26 is defined between the second leg 16 and the central retainer portion 12. Preferably, the first and second junctions 24, 26 are defined by rounded surfaces on the inside (i.e., the side closest to the central axis A). The rounded surfaces at the junctions 24, 26 reduce stress concentration and protect the supported component from rough or sharp edges. The outer surface at the junctions 24, 26 can be more rounded or more sharp, depending upon the manufacturing processes used.

As described above, the proximal ends of the legs 14, 16 preferably terminate at the central retainer portion 12. The distal end of each of the legs 14, 16 preferably terminates at a respect foot 30, 32. Each foot 30, 32 of the illustrated embodiment extends laterally outward from the associated leg 14, 16. The feet 30, 32 preferably define a plane along which the line S extends.

Each foot 30, 32 includes a respective opening 34, 36. The openings 34, 36 preferably are sized and configured to receive a fastener, such as a nail, screw or the like. In the illustrated configuration, the openings 34, 36 are generally circular. In some embodiments, the openings can have other configurations.

With reference now to FIG. 1 again, the legs 14, 16 preferably comprise reinforcing members. In the illustrated embodiment, a pair of gussets 40, 42 reinforces each of the legs 14, 16, respectively. In the illustrated configuration, the gussets 40, 42 have an upper or proximal end 41, 43 (see FIG. 2) that connects with the respective rib 22 of the central retainer portion 12. In one preferred configuration, the proximal end 41, 43 of the gusset 40, 42 extends generally tangentially from the central retainer portion 12. More preferably, the proximal end 41, 43 of the gusset 40, 42 extends generally tangentially from the respective rib 22.

As shown best in FIG. 2, a distal end 45, 47 of each gusset 40, 42 preferably tapers and blends into the material of the associated leg 14, 16. More particularly, in the illustrated embodiment, each leg 14, 16 preferably comprises ribs 44, 46 that preferably are similar in size and configuration to the ribs 22 of the central retainer portion 12. The distal end 45, 47 of each gusset 40, 42 blends in to the ribs 44, 46. In some configurations, the legs 14, 16 do not comprise ribs and the gussets 40, 42 simply simple taper into the material of the legs 14, 16. Moreover, in the illustrated configuration, the gussets 40, 42 preferably are curved between the proximal end 41, 43 and the distal end 45, 47 such that the outer edge is concave when viewed from the front (e.g., FIG. 1). Such a configuration reduces material while providing adequate reinforcement. Reducing material reduces material costs and shipping weight.

In use, the central retainer portion 12 of the offset hanger 10 is snapped onto a pipe or conduit and then fasteners, such as nails, screws or the like, secure the feet 30, 32 to a surface above which, or to the side of which, the pipe or conduit will be located. In some configurations, the offset hangers 10 first are secured in position and the pipe or conduit then is positioned within the central retainer portions 12. The rounded outer edges reduce the likelihood of damage to the pipe or conduit due to vibration. Moreover, the ribs 22, 44, 46 and gussets 40, 42 provide reinforcement to the offset hanger 10 at the outer extremities to provide a more secure grasp of the pipe or conduit.

Although the present invention has been described in terms of a certain embodiment, other embodiments apparent to those of ordinary skill in the art also are within the scope of this invention. Thus, various changes and modifications may be made without departing from the spirit and scope of the invention. For instance, various components may be repositioned as desired. Moreover, not all of the features, aspects and advantages are necessarily required to practice the present invention. Accordingly, the scope of the present invention is intended to be defined only by the claims that follow.

What is claimed is:

1. An offset hanger comprising an integrally formed body, the body comprising a central retainer portion, a first leg extending from the central retainer portion and a second leg extending from the central retainer portion, the central retainer portion comprising a main body having a portion of a generally cylindrical shape, the generally cylindrical shape having an axis, a first rib and a second rib being positioned along the main body and spaced apart in an axial direction of the generally cylindrical shape, the first leg having a proximal end connected to the main body and the second leg having a proximal end connected to the main body, a first pair of gussets spaced apart in the axial direction of the generally cylindrical shape and extending from the first and second ribs of the main body to the first leg, and a second pair of gussets being spaced apart in the axial direction of the generally cylindrical shape and extending from the first and second ribs of the main body to the second leg.

2. The offset hanger of claim 1 further comprising a first foot connected to a distal end of the first leg and a second foot connected to a distal end of the second leg.

3. The offset hanger of claim 2, wherein the first leg comprises a first rib and a second rib that are spaced apart in the axial direction of the generally cylindrical shape.

4. The offset hanger of claim 3, wherein the first pair of gussets taper into the first rib and the second rib of the first leg.

5. The offset hanger of claim 1, wherein the first pair of gussets extend away from the main body in a generally tangential manner.

6. The offset hanger of claim 1, wherein each of the first pair of gussets comprises a curved outer surface when viewed along the axial direction of the generally cylindrical shape.

7. The offset hanger of claim 6, wherein the outer surface has a concave curve.

8. The offset hanger of claim 1, wherein the generally cylindrical shape comprises a cylinder.

9. The offset hanger of claim 1, wherein the central retainer portion defines a segment of the generally cylindrical shape that is greater than 180° but less than 360°.

10. The offset hanger of claim 9, wherein the first and second legs diverge at an angle that is different than an opening angle defined by the segment defined by the central retainer portion.

11. The offset hanger of claim 10, wherein imaginary extensions of the first and second legs intersect within the generally cylindrical shape at a location offset from the axis of the generally cylindrical shape.

12. The offset hanger of claim 11, wherein a first foot is located at a distal end of the first leg, a second foot is located at a distal end of the second leg and the axis of the generally cylindrical shape is positioned between the intersection of the imaginary extensions and the first and second feet.

13. The offset hanger of claim 1, wherein a first juncture is defined between the main body and the first leg and a second juncture is defined between the main body and the second leg, the first and second junctures comprising a rounded surface closest to the axis of the generally cylindrical body.

* * * * *